United States Patent [19]

Fruehan et al.

[11] Patent Number: 4,679,508

[45] Date of Patent: Jul. 14, 1987

[54] TRANSIT VEHICLE DOOR CONTROL APPARATUS

[75] Inventors: Mark T. Fruehan, West Mifflin; Jeffrey A. Fennig, Library; Jayant K. Kapadia, Pleasant Hills, all of Pa.

[73] Assignee: Westinghouse Electric Corp., Pittsburgh, Pa.

[21] Appl. No.: 832,497

[22] Filed: Feb. 21, 1986

[51] Int. Cl.[4] .............................................. B60N 5/00
[52] U.S. Cl. ...................................... 105/341; 49/31; 180/281; 246/187 R
[58] Field of Search .................... 105/341; 246/182 R, 246/182 B, 182 C, 187 R, 187 B; 180/281; 49/31; 364/426

[56] References Cited

U.S. PATENT DOCUMENTS

| | | |
|---|---|---|
| 1,520,067 | 12/1924 | Maury . |
| 1,724,467 | 8/1928 | Forman . |
| 3,575,604 | 4/1971 | Smith ................................ 180/281 X |
| 3,735,345 | 5/1973 | Morozumi . |
| 3,765,502 | 10/1973 | Mark ................................... 180/281 |
| 3,783,339 | 1/1974 | Matty . |
| 3,810,099 | 5/1974 | Woods . |
| 3,810,681 | 5/1974 | Matty . |
| 3,958,783 | 5/1976 | Rhoton ............................ 246/182 B |
| 4,017,044 | 4/1977 | Anderson et al. ............. 246/182 B |
| 4,185,279 | 1/1980 | Bachman . |
| 4,269,377 | 5/1981 | Rush et al. ...................... 246/182 B |
| 4,279,395 | 7/1981 | Boggio et al. .................. 246/182 R |
| 4,302,811 | 11/1981 | McElhenny ........................ 364/426 |
| 4,327,415 | 4/1982 | Rush et al. ........................ 364/436 |
| 4,413,568 | 11/1983 | Huon De Kermadec ... 246/187 B X |

FOREIGN PATENT DOCUMENTS 1536276 12/1978 United Kingdom ................ 180/281

Primary Examiner—Randolph A. Reese
Attorney, Agent, or Firm—D. R. Lackey

[57] ABSTRACT

A transit vehicle having a door includes a zero speed condition detection apparatus provided to logically supply a zero condition output signal for each of a plurality of axles when both of the tachometers for each of those axles are under a predetermined zero speed condition. When two or more zero condition output signals are so supplied, a failsafe driver is energized to operate a control relay for determining the operation of the door.

5 Claims, 6 Drawing Figures

4,679,508

TRANSIT VEHICLE DOOR CONTROL APPARATUS

CROSS REFERENCE TO RELATED APPLICATION

The present application is related to a patent application Ser. No. 750,945, filed July 1, 1985 entitled Transit Vehicle Door Control Apparatus by R. S. Rhoton and which is assigned to the assignee of the present invention.

BACKGROUND OF THE INVENTION

It is important for the desired operation of a transit vehicle door control system to know when the vehicle has reached a predetermined zero speed of operation, such that the vehicle doors can be opened at the proper time to permit the safe movement of passengers to and from the vehicle.

It is known to determine a defined zero speed of a vehicle for the purpose of door opening control in response to signals provided from the wayside, as disclosed in U.S. Pat. No. 3,958,783 of R. S. Rhoton.

It is known to employ a programmed computer control system responsive to a tachometer established zero speed signal which enables door open signals provided at both the front end and the rear end of a train for determining the opening of the doors when the train is positioned as desired, as disclosed by U.S. Pat. No. 4,269,377 of D. L. Rush et. al.

It is known to sense a vehicle slip-slide condition and to control a vehicle in accordance with that condition as disclosed in U.S. Pat. No. 4,392,091 of R. D. Roberts et al.

SUMMARY OF THE INVENTION

An improved vehicle door control apparatus is provided including a zero speed condition detection apparatus operative with three logic circuits. Each logic circuit responds to the output signals from two different tachometers coupled with respective trucks of the vehicle. When at least two of the three logic circuits determine that their coupled tachometers are indicating a vehicle speed less than a predetermined rate, such as three miles per hour, then a no-motion detection apparatus is energized to provide an output signal to a failsafe driver to supply the energizing voltage for a control relay operative to control the vehicle doors.

DESCRIPTION OF A PREFERRED EMBODIMENT

Figure 1:
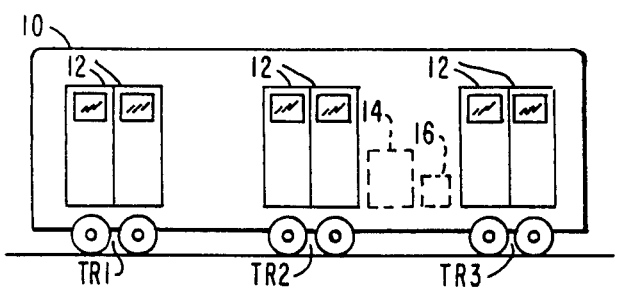
FIG. 1 shows a transit vehicle including door control apparatus and an operator's console.

In FIG. 1 there is shown a transit vehicle 10 having a plurality of doors 12 and including a door control apparatus 14 operative with all of the doors 12, and an operator's console 16. Tachometers 1 and 2 are coupled with respective axles of a first truck at one end of the vehicle, tachometers 3 and 4 are coupled with respective axles of a second truck at the middle of the vehicle and tachometers 5 and 6 are coupled with respective axles of a third truck at the other end of the vehicle 10.

Figure 2:
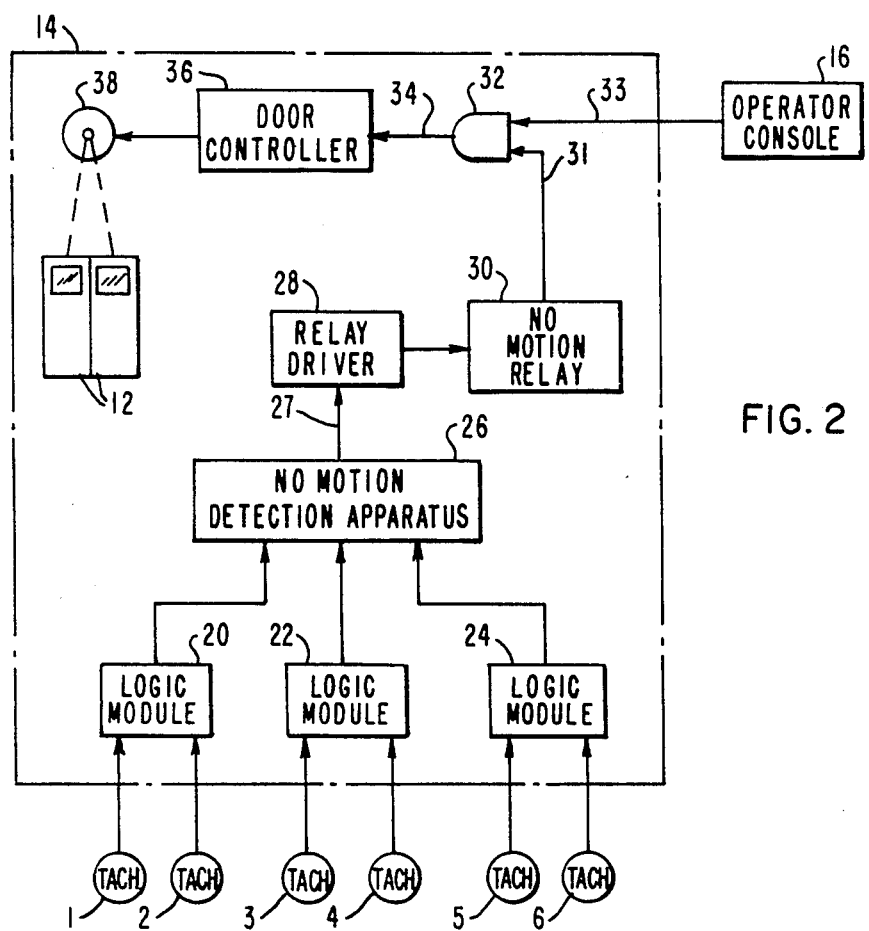
FIG. 2 is a block diargram of the present vehicle door control apparatus.

FIG. 2 shows a vehicle door control apparatus 14 including logic modules 20, 22 and 24 each providing an output signal, when a vehicle zero speed condition is determined, to a no motion detection apparatus 26. The no motion detection apparatus 26 energizes a relay driver for controlling a no motion relay 30 to provide a signal 31 to one input of AND 32. The other input 33 of AND 32 is provided by the operator's console 16. The AND 32 provides signal 34 to enable the desired operation of a door controller 36 coupled through a motor 38 with the doors 12. The logic module 20 is responsive to output signals from tach 1 and tach 2 coupled with respective axles of a first truck of vehicle 10. The logic module 22 is responsive to output signals from tach 3 and tach 4 coupled with the respective axles of a second truck of vehicle 10. The logic module 24 is responsive to output signals from tach 5 and tach 6 coupled with the respective axles of a third truck of vehicle 10.

When two of the logic modules 20, 22 and 24 indicate a vehicle zero speed condition, the no-motion detection apparatus 26 will output a supply voltage signal 27 for the relay driver 28 to operate the no-motion relay 30 for providing one input signal 31 to the AND 32. The second input signal to the AND gate 32 is supplied by the operator's console 14 when it is desired to control the vehicle doors 12. When both inputs are suppled to the AND 32, the door controller 34 is enabled to operate all of the vehicle doors 12 as desired. This system operates a no-motion relay 30 when two of the three truck logic modules 20, 22 and 24 have determined a speed of less than or equal to a predetermined zero speed condition, such as three miles per hour. Energizing the no-motion relay 30 allows the train operator or an automatic vehicle door control system to safely open the doors 12. This system is failsafe in that any failure or series of failures will result in a restrictive condition; namely, the relay 30 will not be energized preventing the opening of the doors 12 above three miles per hour.

Figure 3:
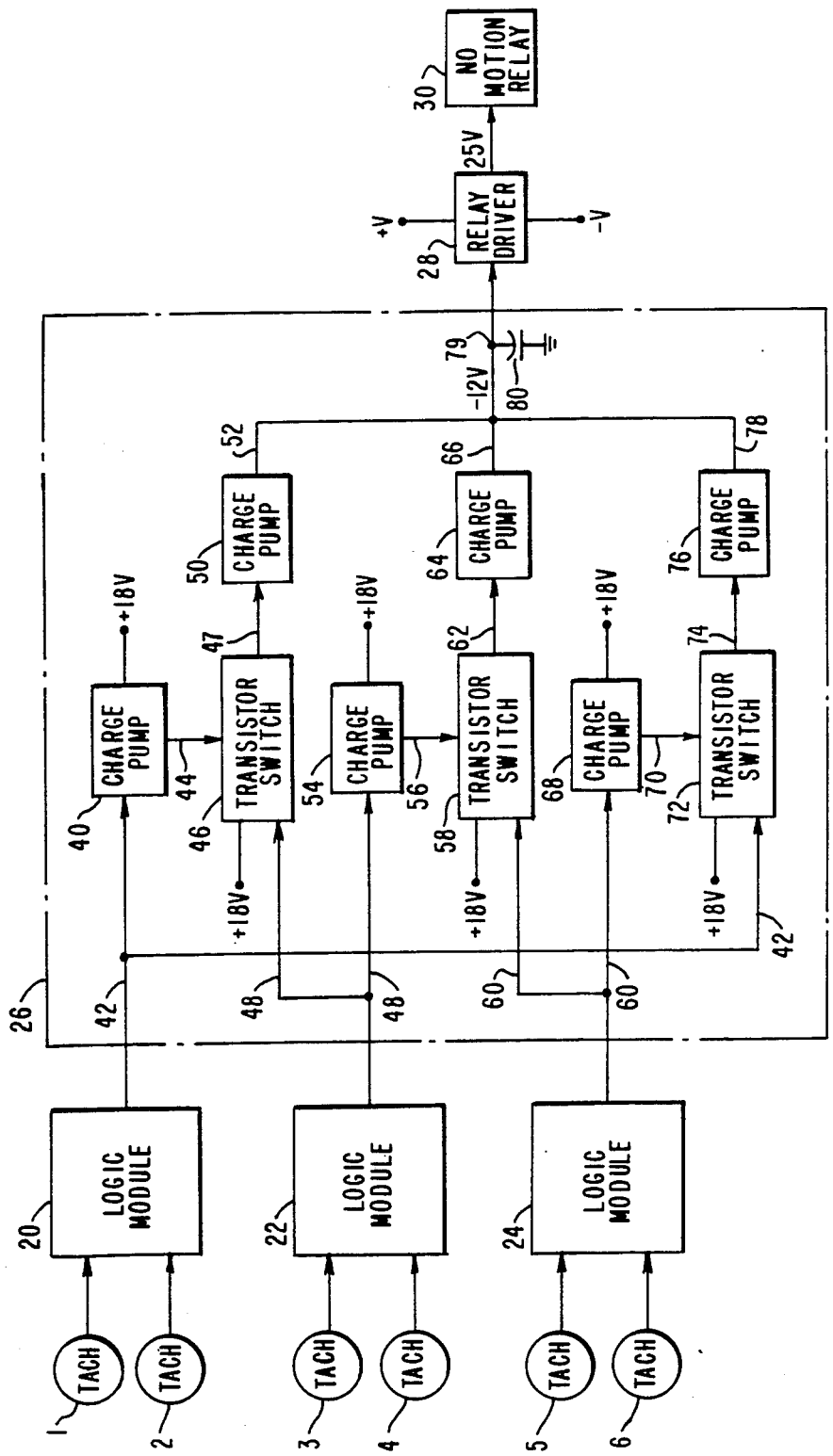
FIG. 3 is a block diagram of the no-motion detection circuit of the door control apparatus shown in FIG. 2.

In FIG. 3, there is shown each of the logic modules 20, 22 and 24 coupled with a pair of the vehicle tachometers from the respective vehicle trucks. The no-motion detection apparatus 26 includes a charge pump 40 responsive to a first input signal 42 from the logic module 20 for providing an enable signal 44 to a transistor switch 46, which is also responsive to a second input signal 48 from the logic module 22. If both of the signals 42 and 48 are provided, the transistor switch 46 provides a signal 47 to energize the charge pump 50 to provide an output signal 52 which energizes the relay dirver 28 to operate the no-motion relay 30.

Similarly, the no-motion detection apparatus 26 includes a charge pump 54 responsive to the signal 48 from the logic module 22 for providing an enable signal 56 to a transistor switch 58, which is also responsive to a signal 60 from the logic module 24. If both of the signals 48 and 60 are provided, the transistor switch 58 provides a signal 62 to energize the charge pump 64 to provide the output signal 66 for energizing the relay driver 28 to operate the no-motion relay 30.

The no-motion apparatus 26 includes a charge pump 68 responsive to the signal 60 from the logic module 24 for providing an enable signal 70 to the transistor switch 72, which is also responsive to a signal 42 from the logic module 20. If both of the signals 60 and 42 are provided, the transistor switch 72 provides a signal 74 to energize the charge pump 76 to provide the output signal 78 for energizing the relay driver 28 to operate the no-motion relay 30.

The basic function of the no-motion detection apparatus 26 is to detect when a car is travelling at at rate of speed equal to or less than a predetermined zero speed such as three miles per hour. If this zero speed condition exists, the apparatus 26 will energize the no-motion relay 30, which will allow the operator to safely open the doors. If this zero speed condition does not exist, the no-motion relay 30 will not be energized, so the doors 12 cannot be opened.

Each vehicle truck includes two tachs, with one provided for each axle. Each tach is read by the logic module associated with that truck to determine the higher of the two tach speed signals, which higher speed is now compared to three miles per hour. If it is equal to or less than three miles per hour, an 18 volt digital output from the logic module will be toggled at a frequency of 109 Hz. If two out of the three trucks detect a zero speed of three miles per hour or less, the no-motion relay 30 will be enabled by at least one of the charge pump circuits 50, 64 and 76.

The charge pump circuits 50, 64 and 76 provide the minus 12 vdc supply voltage needed to operate the relay driver circuit 28. Each one of the $-12$ V charge pumps 50, 64 and 76 can provide the $-12$ V needed, even though the three are OR-ed together at junction 79 operative with the capacitor 80. In order for a $-12$ V charge pump to operate, the 109 Hz and 18 V square wave signals from two truck logic module digital outputs must be present indicating a zero speed condition of three miles per hour or less. The first 109 Hz signal 42 operates a charge pump 40 which produces an output signal 44 of 30 V. This 30 V signal 44 is needed to operate the associated transistor switch 46 and can only be obtained by proper operation of the charge pump 40. The base of the transistor 46 is driven by the other 109 Hz signal 48. The toggling transistor 46 will provide an output toggled signal 47 to operate the output $-12$ V charge pump 50. A dc supply voltage shorted to the input will not operate the latter charge pump 50. A failsafe feature of the system is the fact that the $-12$ vdc generated from the charge pumps 50, 64 and 76 is not generated anywhere else on the board. This prevents a voltage which may be shorted to the relay driver supply voltage from operating the relay driver 28 when a zero speed condition has not been detected by the logic modules 20, 22 and 24. The $-12$ V generated by the charge pumps 50, 64 and 76 is used as the supply voltage for the relay driver 28.

The no-motion detection apparatus 26 receives a digital output signal from each of the three truck logics 20, 22 and 24 and determines if two out of the three truck logics are indicating a car zero speed condition of three miles per hour or less. The first pair of input circuits 40 and 46 have inputs from logic modules 20 and 22. The second pair of input circuits 54 and 58 have inputs from logic modules 22 and 24. The third pair of input circuits 68 and 72 have inputs from logic modules 24 and 20. In this way, all possible combinations of two inputs signals are taken into account.

Figure 4:
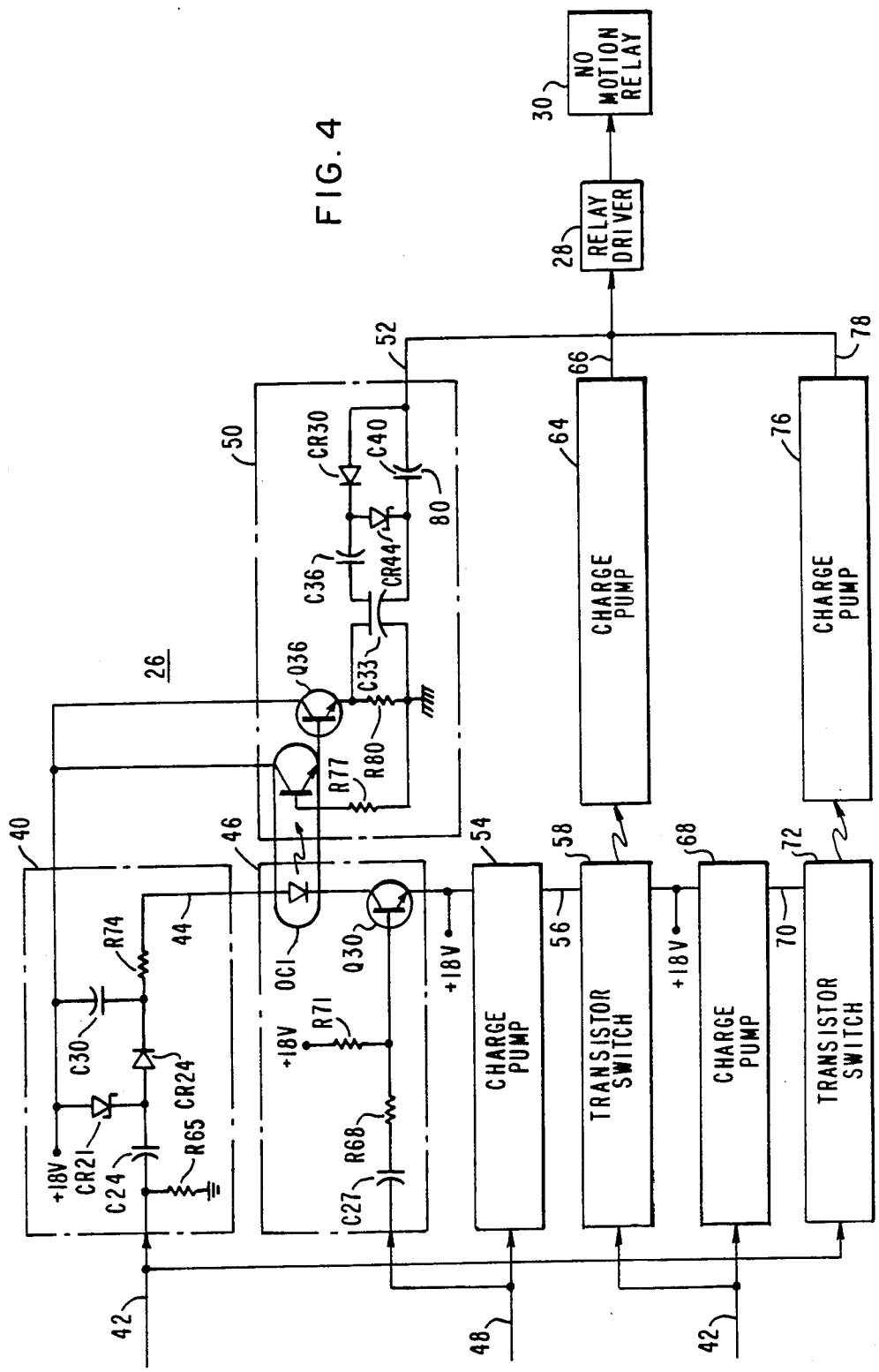
FIG. 4 is a schematic diagram of the no-motion detection circuit shown in FIG. 3.

The operation of the first pair of input circuits 40 and 46 shown in FIG. 4 will be described in detail. The other two pairs of input circuits 54–58 and 68–72 operate in a similar way. The first input circuit 40 of the first pair functions as an enable for the second one 46 and has the digital output signal 42 from logic module 20 as an input. If the logic module 20 has determined that a zero speed condition of three miles per hour or less exists, the logic module 20 will output a 109 Hz and 18 volts square wave 42 to the first input circuit 40, which produces a dc voltage signal 44 of $+30$ vdc output with respect to ground. Capacitor C24 is charged up to $+18$ V through zener CR21. The input resistor R65 acts as a pull down to insure that a true ground exists. When the input voltage 42 swings to $+18$ V, the voltage across capacitor C24 cannot change instantaneously. Therefore, the voltage at the positive terminal of capacitor C24 will jump to $+30$ V limited by zener CR21. Capacitor C30 will now charge up through diode CR24 to 12 V minus, the voltage drop across capacitor CR24. Diode CR24 prevents capacitor C30 from discharging back into resistor R65, and capacitor C30 will now provide a voltage of 11.3 vdc to the diode input of opto-coupler OC1 as long as the toggled input signal 42 exists. The second input circuit 46 is a transistor switch. Capacitor C27 blocks dc current to prevent a shorted supply voltage from turning on transistor Q30. Capacitor C27 also acts as a filter preventing low frequency signals from operating the transistor Q30. Resistors R68 and R71 provide a voltage divider for the base voltage to the transistor Q30. When the 109 Hz square wave 48 is present at the second input circuit 46 in combination with the $+11.3$ vdc from the first input circuit 40, the LED of opto-coupler OC1 will toggle to cause the output photo transistor of opto-coupler OC1 to toggle. Transistor Q36 and the phototransistor of OC1 form a darlington configuration, which is used to operate the $-12$ V charge pump 50. Resistor R74 limits the current in the input circuit of opto-coupler OC1. Resistor R80 limits the current in the output of the darlington, and resistor R77 insures a fast turn off time.

When both input signals 42 and 48 are present from logic modules 20 and 22, the emitter of transistor Q36 will be toggling with respect to ground. This toggled signal at 18 V and 109 Hz will be used to operate the negative charge pump 50 consisting of capacitors C33, c36, and C40 with diodes CR44 and CR30. Failsafe capacitor C33 provides high frequency cutoff to prevent high frequencies from operating the charge pump 50. Transistor Q36 when on charges up capacitor C36 to $+18$ V through transistor Q36 and diode CR44. Transistor Q36 then turns off pulling the positive terminal of capacitor C36 to ground through resistor R80. Since the voltage across a capacitor cannot change instantaneously, the voltage at the negative terminal of capacitor C36 will go to $-12$ V. Zener CR44 provides the 12 V limit. Current will now begin to flow, charging capacitor C40 through diode CR30, capacitor C36 and resistor R80 to $-11.3$ vdc with respect to ground. This voltage is used as the supply voltage to operate the $+25$ V relay driver circuit 28.

The other two input circuits 54–58 and 68–72 operate in the same manner as the input circuit 40–46 just discussed. The outputs of these three circuits are wired "OR" together, and any one of the three can charge up capacitor C40 to produce the −11.3 V needed to operate the 25 V relay driver circuit 28.

When any logic module 20, 22 or 24 determines that both of its tachs are under three miles per hour, it supplies a signal to the no-motion detection voting apparatus 26. When there are two or more logic modules agreeing that their two tachs are under three miles per hour, then this apparatus 26 develops an output signal to drive the failsafe driver 28 to supply the voltage for the relay 30. In the prior art only one logic module was used to determine when the two tachometers of one axle of the vehicle were both under a predetermined zero speed condition. So the present door control apparatus increases the vehicle door control fail safety by having two out of three logic modules vote on the vehicle being at a desired zero speed condition. The combination of output signals from any two logic modules will develop the voltage to energize the relay drive 28.

Figure 5:
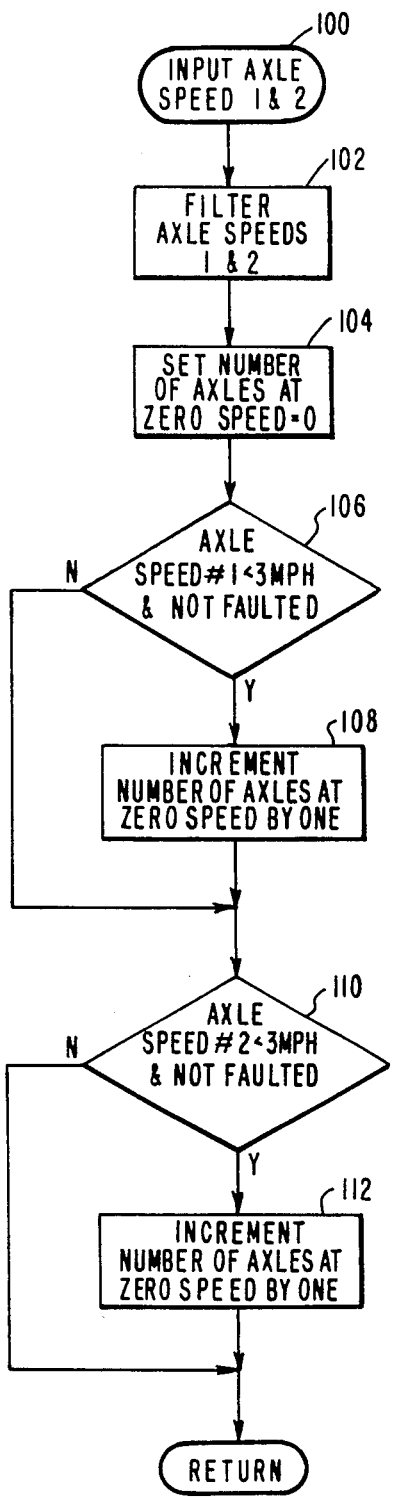
FIG. 5 shows a flow chart of a first control program operative with the microprocessor included with the logic modules shown in FIG. 3 to determine when both axles of the vehicle are below a predetermined zero speed.

In FIG. 5, there is shown a flow chart to illustrate the operation of the control program provided for each logic module, which program is operated as part of the well-known interrupt routine at the 218 Hz chopper frequency. At block 100 the tachometer teeth frequencies are read and some calculations are done in relation to the number of teeth counted in a known time period to convert these frequencies into an axle speed for each of two axles of a particular vehicle truck. At block 102 those axle speeds are filtered and then at block 104 the variable called number-of-axles-at-zero-speed is set equal to zero. At block 106 a check is made to see if speed one is less than three miles per hour, and if yes, at block 108 this number of axles at zero speed variable is incremented by 1. If not, this variable is not incremented. At block 110 a check is made to see if axle speed 2 is less than three miles per hour, and if it is, then block 112 increments this variable by 1 again. So if both the axle speeds 1 and 2 are below zero speed condition, then this variable will equal 2, if none of them then are below a zero speed condition, this variable will equal zero, and if one of them is below a zero speed, this variable is equal to 1.

Figure 6:
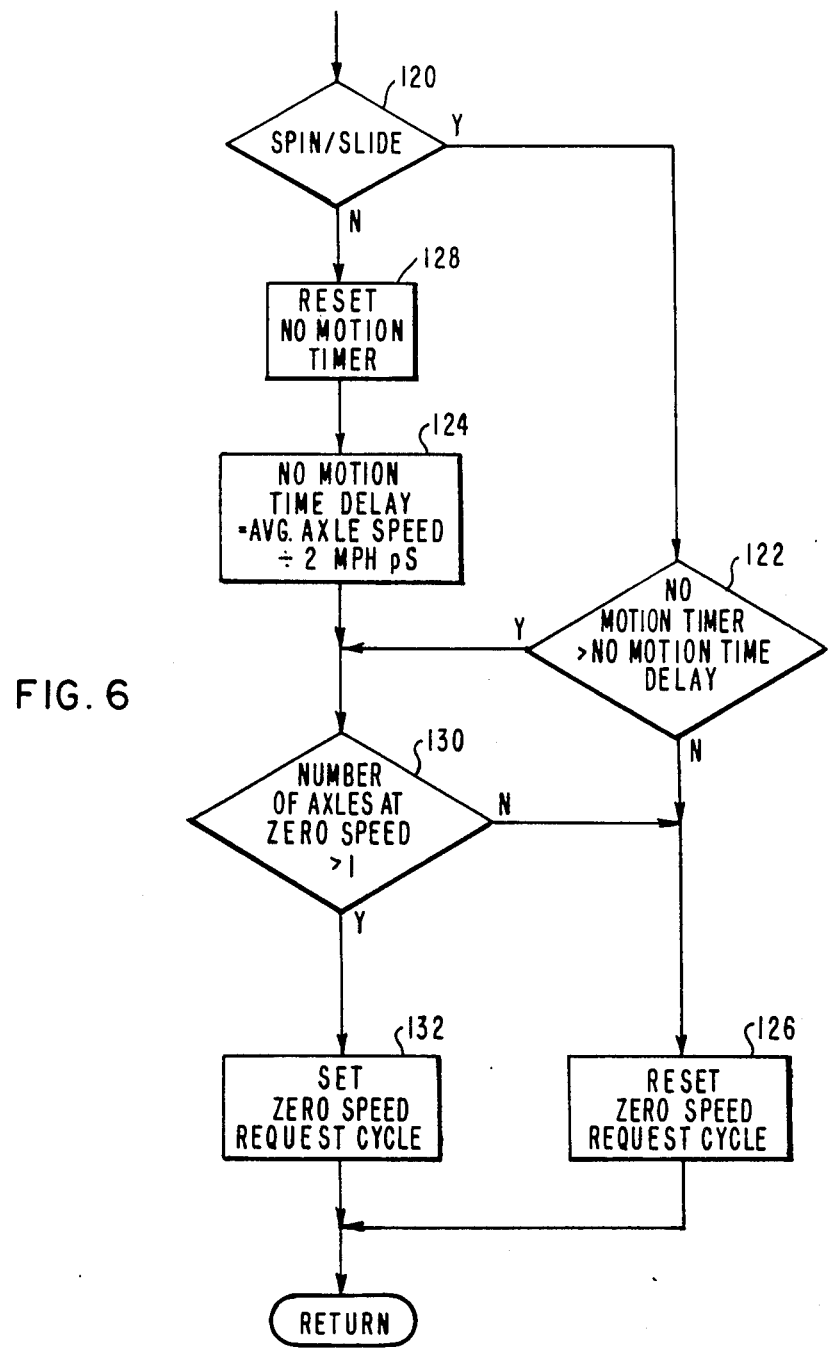
FIG. 6 shows a flow chart of a second control program that determines if a slip-slide condition is present in relation to setting the zero speed request operation.

In FIG. 6, there is shown a flow chart to illustrate the operation of a control program that is added to the well-known vehicle control routine to determine for each of the logic modules if a zero speed condition output signal should be supplied. Block 120 determines if the vehicle is in a spin/slide condition, which is a well-known function and for example can be provided in accordance with the disclosure of above-referenced U.S. Pat. No. 4,392,091 of R. D. Roberts et al. If yes, at block 122 a check is made to see if the no-motion timer is greater than the no-motion time delay which is developed at block 124 for each program cycle when there is no slip/slide condition of the vehicle. If not, the program goes to block 126 to reset the zero speed request cycle flag and then exits. If yes, the program goes to block 130.

If there was no slip/slide condition at block 120, at block 128 the no-motion timer is reset. At block 128 the no-motion time delay is set equal to the average axle speed divided by a predetermined miles per hour per second deceleration rate, such as 2, which relates to how much time is required to reach a zero speed condition with the wheels locked. At block 130, a check is made to see if the number of axles at zero speed is greater than one. If yes, this means two axles are at this condition, so at block 132 the zero speed request cycle flag is set. This flag tells the output routine to start toggling to create the 109 Hz signal from the logic module, and operates to flip a bit at the 218 Hz rate to generate the 109 Hz square wave output. If no, block 126 resets this flag so the output is not toggled.

After the delay time is calculated at block 124 and the flag is reset in block 126, should a slip/slide condition subsequently occur, the output signal cannot be toggled until this time delay is timed out or the vehicle recovers from the slip/slide condition.

We claim:

1. In door control apparatus for a vehicle having at least one door and a plurality of trucks each having two axles, the combination of:
   first means for providing at least two speed signals for each of said trucks;
   second means responsive to the two speed signals for each truck to provide a first output signal for each truck when each of the speed signals for said truck indicate a vehicle speed less than a predetermined speed condition.
   third means responsive to the first output signal for a first truck and the first output signal for a second truck to provide a second output signal,
   fourth means responsive to the first output signal for said second truck and the first output signal for a third truck to provide a third output signal, and
   fifth means responsive to one of said second output signal and said third output signal to control the operation of said door.

2. The door control apparatus of claim 1,
   with the predetermined speed condition relating to a speed equal to or less than three miles per hour.

3. The door control apparatus of claim 1,
   with the third means including a first charge pump responsive to the first output signal for the first truck for providing a fourth output signal, and including a first transistor switch responsive to the first output signal for the second truck and said fourth output signal to determine the provision of said second output signal, and
   with the fourth means including a second charge pump responsive to the first output signal for the second truck for providing a fifth output signal, and including a second transistor switch responsive to the first output signal for the third truck and said fifth output signal to determine the provision of said third output signal.

4. The door control apparatus of claim 1,
   with the second means including a different logic module responsive to the higher of the two speed signals for each truck to provide said first output signal when the higher of said two speed signals is equal to or less than a predetermined zero speed.

5. The door control apparatus of claim 1, with each of the third and fourth means including one charge pump responsive to the first output signal for one of said trucks for providing a first predetermined output signal and another charge pump responsive to said second output signal and the first output signal for another of said trucks for providing a second predetermined output signal, and
   with the first predetermined output signal being different than the second predetermined output signal.

* * * * *